US012030599B2

(12) United States Patent
Van Rompay

(10) Patent No.: US 12,030,599 B2
(45) Date of Patent: Jul. 9, 2024

(54) DEVICE FOR THE CLEANING OF VESSELS

(71) Applicant: Boudewijn Gabriël Van Rompay, Clearwater, FL (US)

(72) Inventor: Boudewijn Gabriël Van Rompay, Clearwater, FL (US)

(*) Notice: Subject to any disclaimer, the term of this patent is extended or adjusted under 35 U.S.C. 154(b) by 596 days.

(21) Appl. No.: 17/281,797

(22) PCT Filed: Oct. 1, 2019

(86) PCT No.: PCT/IB2019/058329
§ 371 (c)(1),
(2) Date: Mar. 31, 2021

(87) PCT Pub. No.: WO2020/070636
PCT Pub. Date: Apr. 9, 2020

(65) Prior Publication Data

US 2021/0380207 A1 Dec. 9, 2021

(30) Foreign Application Priority Data

Oct. 2, 2018 (BE) .................................. 2018/5672

(51) Int. Cl.
*B63B 59/08* (2006.01)
*A46B 13/00* (2006.01)
*A46B 13/02* (2006.01)
*B08B 1/12* (2024.01)
*B08B 1/32* (2024.01)
*B08B 13/00* (2006.01)

(52) U.S. Cl.
CPC ............ *B63B 59/08* (2013.01); *A46B 13/001* (2013.01); *A46B 13/02* (2013.01); *B08B 1/12* (2024.01); *B08B 1/32* (2024.01); *B08B 13/00* (2013.01); *A46B 2200/3073* (2013.01)

(58) Field of Classification Search
CPC ... B63B 59/06; B63B 59/08; B63B 2059/082; B63B 2059/08
See application file for complete search history.

(56) References Cited

U.S. PATENT DOCUMENTS

2008/0216732 A1* 9/2008 Doyle ..................... B63B 59/10 114/222
2016/0144937 A1* 5/2016 Van Rompay .......... B66C 23/18 134/6

FOREIGN PATENT DOCUMENTS

BE 1013429 A3 1/2002
BE 1014204 A3 6/2003

(Continued)

OTHER PUBLICATIONS

International Search Report mailed Nov. 12, 2019 pertaining to PCT Application No. PCT/IB2019/058329, filed Oct. 1, 2019, 4 pages.

*Primary Examiner* — Shay Karls
(74) *Attorney, Agent, or Firm* — Dinsmore & Shohl LLP

(57) ABSTRACT

A device for the cleaning of a submerged section of the hull of a vessel that is treated with a non-toxic layer of paint based on a surface-treated coating. The device comprises a platform with a first cleaning module and with a device to place and move the cleaning module against the side of the hull of the vessel and that the device is further provided with a launch platform with a second cleaning module which can place the second cleaning module against the bottom of the hull. The second cleaning module is connected via a first cable to the launch platform for the movement and control thereof.

20 Claims, 2 Drawing Sheets

(56) References Cited

FOREIGN PATENT DOCUMENTS

| | | | |
|---|---|---|---|
| BE | 1015235 | A3 | 11/2004 |
| EP | 3025951 | A1 | 6/2016 |
| JP | S51135099 | A | 11/1976 |

* cited by examiner

DEVICE FOR THE CLEANING OF VESSELS

CROSS-REFERENCE TO RELATED APPLICATIONS

The present application is the National Phase entry of International Patent Application No. PCT/IB2019/058329 filed Oct. 1, 2019, the entire contents of which are hereby incorporated by reference into this application.

TECHNICAL FIELD

The present disclosure relates to a device for the cleaning of vessels.

BACKGROUND

In particular, the present disclosure is intended to clean the submerged part of the hull and other parts of vessels that have been treated with a non-toxic layer of paint based on a surface-treated coating such as, for example, a composite reinforced with glass flakes.

Traditionally, the hull and other components of a vessel are treated with a biocide-containing toxic layer of paint.

Such layer of paint is to combat so-called biofouling.

It is known that on the hull of a vessel, in particular of a sea-going vessel, more specifically on the part located under water, shellfish, algae and other organisms grow, such that the vessel experiences greater resistance while moving through the water. Consequently, the consumption of fuel increases.

Preventive action is taken and the slime layer that is deposited on a new or cleaned hull and on which the biofouling attaches, is cleaned at regular intervals.

A disadvantage of the known biocide-containing toxic layer of paint is that such layers of paint easily wear off and/or are damaged during cleaning. Consequently, it is necessary for the layer of paint to be applied again after a number of cleanings.

Moreover, after a number of cleanings, the effect of the layer of paint will decrease, such that more biofouling will occur when the vessel is operational again.

This biofouling causes the vessel to experience more resistance when moving through the water. Consequently, the consumption of fuel increases.

Moreover, vessels treated with such layers of paint cannot be cleaned when the vessel is located in the water.

During the cleaning of such vessels with traditional layers of paint, many toxic substances are indeed released which are harmful for the environment and marine life.

Consequently, it is necessary that the cleaning of the hull and other parts of the vessel takes place in a dry dock.

The disadvantage of this method is that it takes a lot of time, which means the vessel is unavailable for a long time.

Vessels treated with a surface-treated coating, such as a composite reinforced with glass flakes, experience the disadvantages to a much lesser extent, as the layer of paint is much more resistant and does not contain any toxic substances that may be released during cleaning.

Typically, the cleaning of such vessels treated with a surface-treated layer of paint is done in the water by divers by machines with rotating brushes.

Although the cleaning of vessels with a surface-treated layer of paint can be done much faster and easier than in the case of vessels with a toxic traditional layer of paint, there are some disadvantages to using divers.

Visibility in the water may be limited, which may make it difficult to carry out the cleaning properly.

Moreover, the divers are sometimes exposed to strong currents under water, which can make cleaning dangerous.

In addition, a large number of professional divers are needed who are spread around the world in the ports, whereby the hiring of suitable divers can sometimes be a problem.

Even with this method the cleaning of a vessel takes one or more days, a period during which the vessel is not operationally available.

From the Belgian patents nos. 1.013.429, 1.014.204 and 1.015.235 of the same applicant, devices are known for the removal of the biofouling on a hull of a vessel, the devices consisting of a cleaning element which is pressed against the hull of the vessel by a cable that runs transversely under the hull of the vessel and whereby the cleaning element, by running the cable under the vessel, is moved across the hull from one side of the hull to the other side of the hull, thus cleaning a strip of the width of the mat on the hull.

To run the cable under the vessel, the cable is attached for example to two winches set up opposite from each other on either side on the deck of the vessel, whereby, for the cleaning of the hull, the cable is rolled up on one winch, while rolling off the other winch respectively.

Each of the winches is set up movably lengthways of the vessel to be able to clean the hull strip after strip.

However, the known devices do not always achieve the hoped for result, particularly in vessels with a flat bottom as is usually the case in big sea-going vessels with a length of for example 400 metres or more but also in the case of relatively small vessels of for example 80 metres in length.

Such flat bottom can cover a considerable surface of for example 400 metres by 55 metres. It's clear that cleaning such surface by divers represents a considerable workload.

Another disadvantage concerns the bilge keels, these are long plates that are placed lengthways in a perpendicular direction to the hull, at the location where the hull changes from the bottom to the side.

At the location of the bilge keels, the cleaning elements cannot make any or only difficult contact with the bottom either, as they have to move over the bilge keels there.

This location also causes problems with the cable scraping along the bilge keels.

The purpose of the present disclosure is to provide a solution to at least one of the above and other disadvantages.

SUMMARY

To this end, the present disclosure relates to a device for cleaning of a submerged section of a hull of a vessel that has been treated with a non-toxic layer of paint based on a surface-treated coating. The device comprises a platform with a first cleaning module and with a device to place and move the cleaning module against the side of the hull of the vessel. The device is further provided with a launch platform with a second cleaning module which can place the second cleaning module against the bottom of the hull. The second cleaning module is connected via a first cable to the launch platform for the movement and control thereof.

This provides the advantage that with the help of such a device, the hull of a vessel can be cleaned quickly and on an industrial scale.

Moreover, the vessel does not have to be in a dry dock, considering that the cleaning can be done under water. Moreover, no divers are needed.

By using the surface-treated coating, there will be practically no biofouling, this means that practically no biofouling will be formed on the vessel's hull, which in turn results in the vessel experiencing less resistance. In this way fuel can be saved and there will be less $CO_2$ emission.

Moreover, when cleaning a surface-treated coating no biocides will be released and cause local pollution.

In addition, a surface-treated coating will not be damaged or partially removed by cleaning, such that no corrosion problems will occur.

The surface-treated coating will also require less maintenance.

Yet another advantage consists in that by using the launch platform and the second cleaning module specifically for the bottom of the hull, it is possible to avoid a cleaning module or a cable having to pass over or along a bilge keel. In this way, the poor cleaning of the hull at the location of the bilge keels as well as the scraping of the cable along the bilge keels can be avoided.

Moreover, the bilge keels themselves and the vessel's hull on the level of the bilge keels can also be cleaned by allowing both the first and the second cleaning module to come up against the bilge keels.

In some embodiments, the first and second cleaning module comprise a frame with a number of roller brushes mounted therein. The roller brushes are driven by a motor. Axles of the roller brushes extend horizontally and parallel to the hull of the vessel during operation.

Such cleaning module can be made in a big size, and a big cleaning surface will be obtained.

The roller brushes will suck themselves as it were against the hull of the vessel during operation under water as a result of the swirls in the water caused by the rotation of the roller brushes around their axles.

In a practical embodiment, the platform is a vessel or the like.

This has the advantage that the device can be placed in a port or the like, whereby vessels can sail along the platform, after which the two cleaning elements can be placed against the side and the bottom of the hull to clean the hull.

The vessel may be, for example, a workboat, pontoon or the like.

BRIEF DESCRIPTION OF THE DRAWINGS

With the intention of better showing the characteristics of the present disclosure, embodiments of a device according to the present disclosure for the cleaning of vessels are described hereinafter by way of an example, without any limiting nature, with reference to the accompanying figures, wherein:

FIG. 1 schematically shows a sea-going vessel 1, the hull 2 of which is located in the water.

Figure 1:
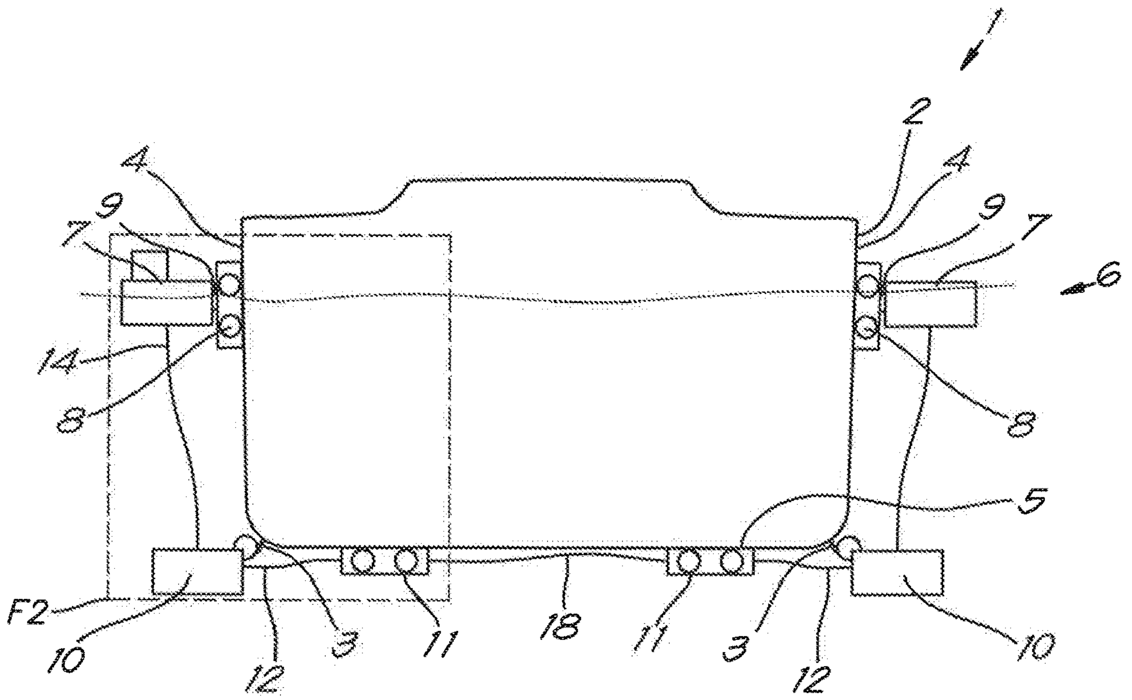
FIG. 1 schematically shows a device according to the present disclosure.

The hull 2 is provided with so-called bilge keels 3, which extend in a longitudinal direction of the vessel 1 on the location where the side 4 of the hull 2 changes into the bottom 5 of the hull 2.

The bilge keels 3 are installed perpendicular to the hull 2.

The hull 2, or at least the submerged sections of the hull 2, are treated with a non-toxic layer of paint based on a surface-treated coating.

In this case this surface-treated coating comprises a composite reinforced with glass flakes.

The coating is not only effective in preventing biofouling of the hull 2 of the vessel 1, but also that no biocides will be released when cleaning the hull 2 of the vessel 1. Moreover, the coating will not be damaged or wear off, such that practically no maintenance or repairs are necessary to the coating itself.

FIG. 1 also shows a device 6 for the cleaning of a submerged section of the hull 2 of the vessel 1.

According to the present disclosure, the device 6 comprises the following components: a platform 7 with a first cleaning module 8 and with a device 9 to place and move the cleaning module 8 against the side 4 of the hull 2 of the vessel 1; and a launch platform 10 with a second cleaning module 11 which can place the second cleaning module 11 against the bottom 5 of the hull 2.

As shown in FIG. 1, in this case there are two platforms 7 and two first cleaning modules 8 and two launch platforms 10 with two second cleaning modules 11. In other words, the device 6 is made symmetrically. This is not necessary for the present disclosure.

The platform 7 in the example shown is made as a vessel, such as for example a floating pontoon or workboat. However, this is not necessarily the case. The platform 7 could also be on the quay.

The device 9 to place and move the cleaning module 8 against the side 4 of the hull 2 can be realised in different ways. For the efficient operation of the device 6 it is sufficient if the devices 9 can move the cleaning module 8 up and down against the hull 2 of the vessel 1.

The launch platform 10 can be made as a kind of cage, in which the necessary equipment is installed and to which or in which the second cleaning module 11 can be installed.

This launch platform 10 is intended to be submerged in the water. As will be clear from the description, this launch platform 10 can be considered as an underwater engine room, also called a 'submergable engine room'.

According to the present disclosure the second cleaning module 11 is connected via a first cable 12 to the launch platform 10 for the movement and control thereof.

Figure 2:
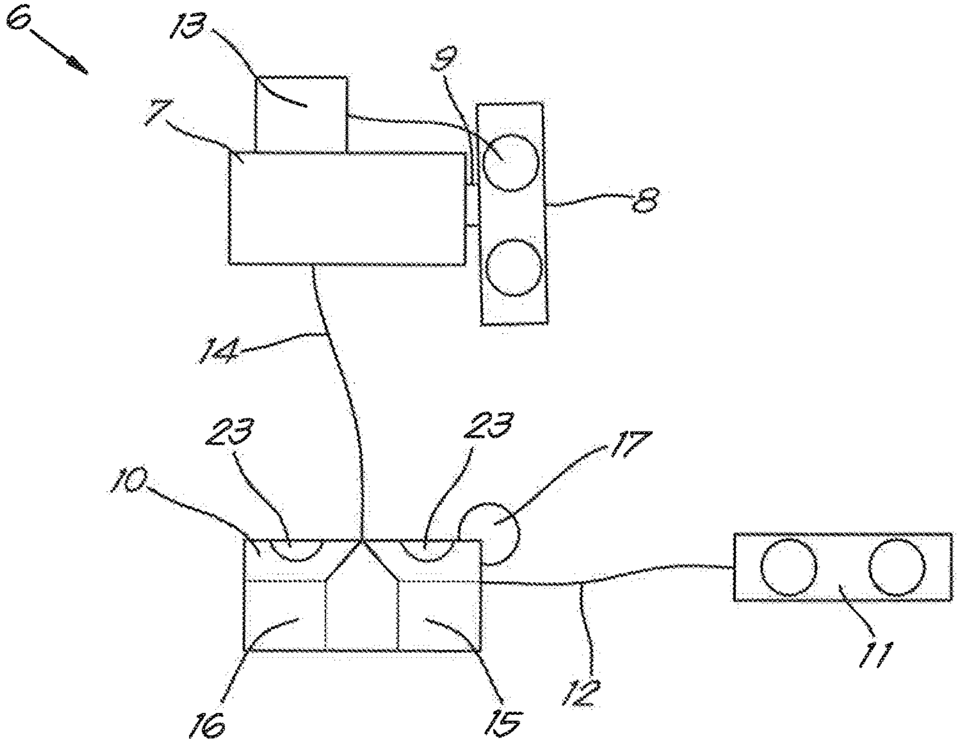
FIG. 2 on a larger scale and in more detail shows the section indicated in FIG. 1 by F2.

FIG. 2 shows a section of the device 6 in more detail.

This figure shows that the platform 7 is provided with a control unit 13 to control the movement of the platform 7 and of the first cleaning module 8.

The launch platform 10 is connected to the platform 7, in particular to the control unit 13 of the platform 7, by a second cable 14 to control the launch platform 10.

It is clear that the launch platform 10 can also be controlled in other ways other than by the second cable 14 and the control unit 13.

It is also not excluded that the second cleaning module 11 is also controlled by the second cable 14.

However, in this case, the launch platform 10 is provided with a control unit 15 to control the second cleaning module 11.

The control is via the first cable 12. This cable 12 is what is called an "umbilical cable", a rigid, thick and not very flexible cable 12 to send all the necessary control signals, electrical and hydraulic energy, etc. from the launch platform 10, in particular from the control unit 15, to the second cleaning module 11.

By working with the launch platform 10 for the second cleaning module 11, this first cable 12 can be kept much shorter than when the second cleaning module 11 were to be connected via the platform 7.

The first cable 12 will also be used to control the movement of the second cleaning module 11.

The launch platform 10 is also provided with propulsion device 16, such as for example propellers, rotors, thrusters or the like to move under water.

Furthermore, the launch platform 10 is provided with a stop 17 for the hull 2 of the vessel 1 in the form of one or more wheels, fender cushions or the like.

This will allow the launch platform 10 to come very close, up against the hull 2 of the vessel 1, without the possibility of damage, both to the vessel 1 and the launch platform 10.

As shown in FIG. 1, the two second cleaning modules 11 are connected to each other by a cable 18, the cable hereinafter referred to as the 'connecting cable 18'.

This connecting cable 18 can be a regular cable and does not have to be a so-called "umbilical cable". It will only be used for the physical coupling of the second cleaning modules 11 to each other and not for control, energy transfer or the like.

This cable 18 will be used to be able to move both cleaning modules by pulling, this will be explained later.

Figure 3:
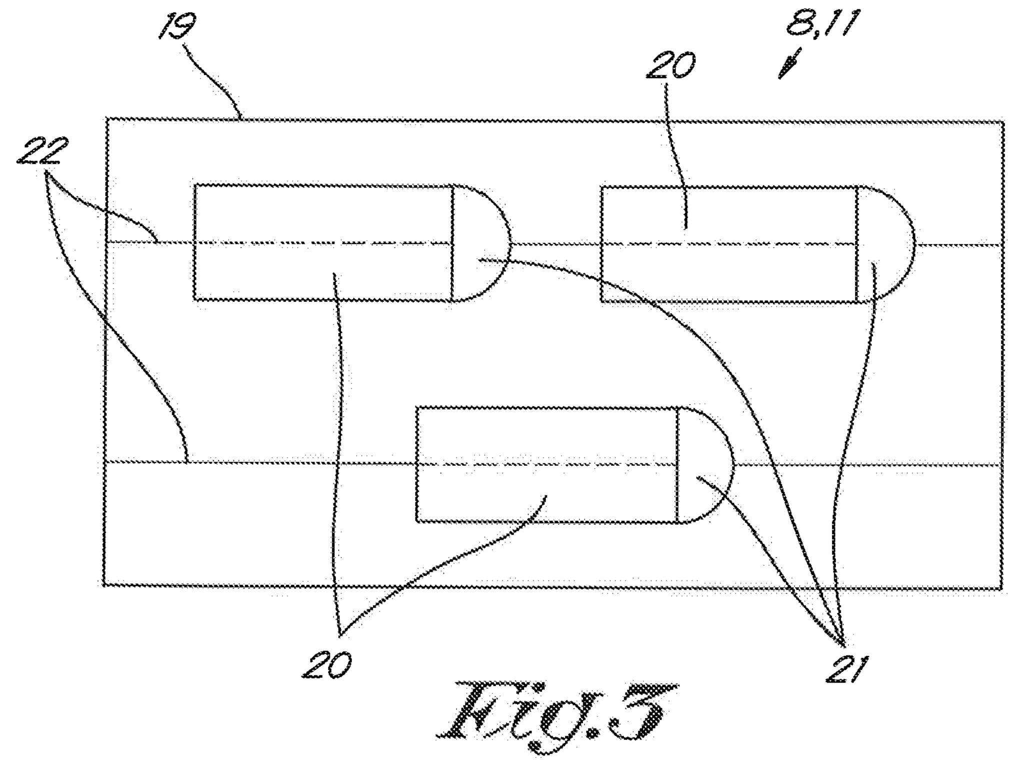
FIG. 3 shows a practical embodiment of a cleaning element.

FIG. 3 shows a possible embodiment of a cleaning module 8, 11 in more detail.

The cleaning module 8, 11 comprises a frame 19 with a number of roller brushes 20 mounted therein, whereby the roller brushes 20 are driven by a motor 21, whereby the axles 22 of the roller brushes 20 extend horizontally and parallel with the hull 2 of the vessel 1 during operation.

The roller brushes 20 thus also extend parallel to each other and are placed in a sort of staggered set-up.

In this case there are three roller brushes 20, which can rotate around their axles 22. It is also possible there are only one, two, four, five or more roller brushes 20.

The roller brushes 20 overlap slightly in a direction perpendicular to the axles 22, such that a completely uninterrupted cleaning surface is obtained when the cleaning module 8, 11 is moved over the hull 2 of the vessel 1.

In this case the launch platforms 10 also contain one or several floats 23 or floating elements or the like which will generate an upthrust. In some embodiments, the upthrust of these floats 23 is adjustable. This could be realised, for example, by making the floats 23 in the form of air cushions or the like, which can be filled with more or less air in order to regulate the upthrust of the floats 23.

The operation of the device 6 is very simple and as follows.

The platforms 7 and the launch platforms 10 first sail to a vessel 1 to be cleaned.

The platforms 7 position themselves on either side of the vessel 1 with the first cleaning modules 8 oriented to the side 4 of the hull 2.

The launch platforms 10 are placed on the level of the bottom 5 of the hull 2, by possibly raising or lowering them in the water such that they are at the right level, whereby the second cleaning modules 11 are located on the level of the bottom 5 of the hull 2. The floats 23 can be used for this.

The stops 17 will be up against the hull 2 or bilge keels 3.

Then the whole device 6 moves along the vessel 1, as shown in FIG. 1, whereby the first cleaning modules 8 make contact with the side 4 and the second cleaning modules 11 with the bottom 5.

It is of course also possible that the device 6 is set up at a certain location and that the vessel 1 sails to it.

The device 6 can then be put into operation. The roller brushes 20 of the cleaning modules 8, 11 are put into operation by switching on the motors 21.

The cleaning modules 20 will suck themselves, as it were, onto the hull 2 of the vessel 1.

The cleaning of the hull 2 can then be started: the first cleaning modules 8 are moved in an upward and downward movement against the side 4 by the platforms 7.

They will move up against the bilge keels 3, to clean the hull 2 at the level of the bilge keels 3 and the upward facing side of the bilge keels 3 themselves.

The second cleaning modules 11 are moved back and forth over the bottom by alternately rolling up and down or extending and retracting the first two cables 12, in such a way that the two second cleaning modules 11, by the operation of the connecting cable 18 between both second cleaning modules 11, are moved synchronously back and forth over the bottom 5 of the hull 2.

The second cleaning modules 11 will also move up against the bilge keels 3 to thus clean the hull 2 on the level of the bilge keels 3 and the downward facing side of the bilge keels 3 themselves.

After one upward and downward movement of the first cleaning modules 8 and one lateral back and forth movement of the second cleaning modules 11 the biofouling will be removed.

Possibly a second movement of the cleaning modules 8, 11 can be executed. The device is then moved to a following section of the hull 2 to be cleaned. Alternatively, the vessel 1 can also be repositioned in relation to the device 6.

The cleaning modules 8, 11 are moved in a similar way as described above on the next section of the hull 2 to be cleaned.

It is also possible that the cleaning modules 8, 11 make a continuous upward and downward and back and forth movement, while the device 6 moves slowly along the vessel 1 or the vessel 1 moves slowly through it.

In this way, the hull 2 and bilge keels 3 can be cleaned quickly. To clean the front and the back of the vessel, divers can be used. These sections constitute only a small share of the total surface area of the vessel.

Although in the example shown above, the cleaning modules 8, 11 comprise roller brushes, it cannot be excluded that the first and second cleaning modules 8, 11 comprise a frame 19 with a number of sponges mounted therein. By the upward and downward and back and forth movement of the cleaning modules 8, 11 against the hull 2 of the vessel 1, the sponges can be rubbed against the hull 2 of the vessel 1 to thus clean the hull 2.

The present disclosure is not limited to the embodiments described as an example and shown in the drawings, but a device according to the present disclosure for the cleaning of vessels can be realised in all kinds of forms and dimensions, without departing from the scope of the present disclosure.

The invention claimed is:

1. A device for cleaning a submerged section of a hull of a vessel that is treated with a non-toxic layer of paint based on a surface-treated coating, the device comprises:

a platform with a first cleaning module, the first cleaning module is configured to be placed and move against a side of the hull of the vessel; and a launch platform with a second cleaning module which can place the second cleaning module against a bottom of the hull, the second cleaning module is connected to the launch platform via a first cable for movement and control thereof, wherein the launch platform is connected to the platform by a second cable for the control of the launch platform.

2. The device according to claim 1, wherein the launch platform is provided with a stop for the hull of the vessel, the stop is at least one wheel or at least one fender cushion.

3. The device according to claim 2, wherein each of the first cleaning module and the second cleaning module includes a frame with a plurality of roller brushes mounted therein, the roller brushes are driven by a motor, wherein axles of the roller brushes extend horizontally and parallel with the hull of the vessel during operation.

4. The device according to claim 2, wherein the platform is a vessel.

5. The device according to claim 2 further comprising:

a secondary platform with a secondary first cleaning module; and a secondary launch platform with a secondary second cleaning module.

6. The device according to claim 5, wherein the second cleaning module and the secondary cleaning module are connected to each other by a cable.

7. The device according to claim 6, wherein the secondary second cleaning module is connected to the secondary launch platform via a secondary first cable for movement and control thereof the second cleaning module and the secondary second cleaning module are moved over the bottom of the hull of the vessel by alternately rolling up and down or extending and retracting the first cable and the secondary first cable, in such a way that the second cleaning module and the secondary second cleaning module are moved synchronously back and forth over the bottom of the hull.

8. The device according to claim 7, wherein the launch platform is provided with at least one float or at least one floating element.

9. The device according to claim 1, wherein each of the first cleaning module and the second cleaning module includes a frame with a plurality of roller brushes mounted therein, the roller brushes are driven by a motor, wherein axles of the roller brushes extend horizontally and parallel with the hull of the vessel during operation.

10. The device according to claim 9, wherein the platform is a vessel.

11. The device according to claim 9 further comprising:

a secondary platform with a secondary first cleaning module; and a secondary launch platform with a secondary second cleaning module.

12. The device according to claim 11, wherein the second cleaning module and the secondary cleaning module are connected to each other by a cable.

13. The device according to claim 12, wherein the secondary second cleaning module is connected to the secondary launch platform via a secondary first cable for movement and control thereof the second cleaning module and the secondary second cleaning module are moved over the bottom of the hull of the vessel by alternately rolling up and down or extending and retracting the first cable and the secondary first cable, in such a way that the second cleaning module and the secondary second cleaning module are moved synchronously back and forth over the bottom of the hull.

14. The device according to claim 13, wherein the launch platform is provided with at least one float or at least one floating element.

15. The device according to claim 1, wherein the platform is a vessel.

16. The device according to claim 1 further comprising:

a secondary platform with a secondary first cleaning module; and a secondary launch platform with a secondary second cleaning module.

17. The device according to claim 16, wherein the second cleaning module and the secondary cleaning module are connected to each other by a cable.

18. The device according to claim 17, wherein the secondary second cleaning module is connected to the secondary launch platform via a secondary first cable for movement and control thereof the second cleaning module and the secondary second cleaning module are moved over the bottom of the hull of the vessel by alternately rolling up and down or extending and retracting the first cable and the secondary first cable, in such a way that the second cleaning module and the secondary second cleaning module are moved synchronously back and forth over the bottom of the hull.

19. The device according to claim 1, wherein the launch platform is provided with at least one float or at least one floating element.

20. The device according to claim 1, wherein the coating is a composite reinforced with glass flakes.

* * * * *